(12) United States Patent
Chakraborty et al.

(10) Patent No.: US 10,528,762 B2
(45) Date of Patent: *Jan. 7, 2020

(54) DENIABLE OBFUSCATION OF USER LOCATIONS

(71) Applicant: International Business Machines Corporation, Armonk, NY (US)

(72) Inventors: Supriyo Chakraborty, White Plains, NY (US); Omer Tripp, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/800,262

(22) Filed: Nov. 1, 2017

(65) Prior Publication Data
US 2018/0300505 A1 Oct. 18, 2018

Related U.S. Application Data

(63) Continuation of application No. 15/489,887, filed on Apr. 18, 2017.

(51) Int. Cl.
*H04L 29/06* (2006.01)
*G06F 21/62* (2013.01)

(52) U.S. Cl.
CPC .. *G06F 21/6254* (2013.01); *G06F 2221/2111* (2013.01)

(58) Field of Classification Search
CPC ..... G06F 2221/2111; G06F 2221/2141; G06F 21/30; G06F 21/60; G06F 21/64
See application file for complete search history.

(56) References Cited

U.S. PATENT DOCUMENTS 6,289,458 B1 * 9/2001 Garg .................. G06F 21/6281
726/1
6,859,791 B1 2/2005 Spagna
(Continued)

OTHER PUBLICATIONS

List of IBM Patents or Patent Applictions Treated As Related; (Appendix P), Filed Nov. 1, 2017, 2 pages.
(Continued)

*Primary Examiner* — Hosuk Song
(74) *Attorney, Agent, or Firm* — Cantor Colburn LLP; Kevin Michael Jordan

(57) ABSTRACT

Aspects of the invention include receiving, using a processing system, a geographic location of a user. A trust level of an application is determined. Based at least in part on the trust level of the application meeting a threshold, the geographic location of the user is transmitted to the application. Based at least in part on the trust level of the application not meeting the threshold, a semantic label associated with the geographic location of the user is determined. The semantic label describes a type of place located at the geographic location of the user. An obfuscated geographic location that preserves the privacy of the geographic location of the user and is associated with a semantic label consistent with the semantic label associated with the geographic location of the user is generated. The obfuscated geographic location is transmitted to the application in place of the geographic location of the user.

7 Claims, 4 Drawing Sheets

(56) References Cited

U.S. PATENT DOCUMENTS

| | | | |
|---|---|---|---|
| 7,591,020 B2* | 9/2009 | Kammer | G06F 21/6218 380/258 |
| 8,069,142 B2 | 11/2011 | Davis et al. | |
| 8,427,979 B1* | 4/2013 | Wang | H04B 1/707 370/254 |
| 8,806,653 B2* | 8/2014 | Di Rienzo | G01S 5/14 340/988 |
| 9,191,788 B2 | 11/2015 | Somekh et al. | |
| 9,342,783 B1 | 5/2016 | Chang et al. | |
| 9,390,228 B2* | 7/2016 | Reid | H04L 63/061 |
| 9,973,484 B2 | 5/2018 | Reid | |
| 2006/0179050 A1 | 8/2006 | Giang et al. | |
| 2010/0064373 A1 | 3/2010 | Cai et al. | |
| 2012/0309350 A1 | 12/2012 | Kim | |
| 2014/0379628 A1 | 12/2014 | Agrawal | |
| 2016/0093208 A1 | 3/2016 | Duan et al. | |
| 2016/0150361 A1 | 5/2016 | Zhu et al. | |
| 2016/0275788 A1 | 9/2016 | Wu | |
| 2017/0083708 A1 | 3/2017 | Braghin | |
| 2018/0300503 A1 | 10/2018 | Chakraborty et al. | |
| 2018/0302413 A1 | 10/2018 | Chakraborty et al. | |

OTHER PUBLICATIONS

Supriyo Chakraborty, et al., Pending U.S. Appl. No. 15/800,247 entitled "Plausible Obfuscation of User Location Trajectories," filed with the U.S. Patent and Trademark Office on Nov. 1, 2017.

Andreas et al. "Geo-indistinguishability: Differential privacy for location-based systems." Proceedings of the 2013 ACM SIGSAC conference on Computer & communications security, 14 pages.

Damiani et al., . "The PROBE Framework for the Personalized Cloaking of Private Locations." Transactions on Data Privacy 3.2 (2010), 13 pages.

De Mulder et al. "Identification via location-profiling in GSM networks." Proceedings of the 7th ACM workshop on Privacy in the electronic society. ACM, 2008, 10 pages.

Hoh et al., "Protecting location privacy through path confusion." First International Conference on Security and Privacy for Emerging Areas in Communications Networks (SECURECOMM'05). IEEE, 2005, 12 pages.

Huang, et al. "Towards modeling wireless location privacy." International Workshop on Privacy Enhancing Technologies. Springer Berlin Heidelberg, 2005, 19 pages.

Johnson et al. "Context Evidence and Location Authority: the disciplined management of sensor data into context models." Proceedings of the first International Workshop on Context Modelling, Reasoning and Management at UbiComp. 2004, 6 pages.

Meyerowitz et al., "Hiding stars with fireworks: location privacy through camouflage." Proceedings of the 15th annual international conference on Mobile computing and networking. ACM, 2009, 12 pages.

Pan et al., "Trace analysis and mining for smart cities: issues, methods, and applications." IEEE Communications Magazine 121 (2013), 7 pages.

Shokri et al. "Protecting location privacy: optimal strategy against localization attacks." Proceedings of the 2012 ACM conference on Computer and communications security, 11 pages.

Theodorakopoulos et al. "Prolonging the hide-and-seek game: Optimal trajectory privacy for location-based services." Proceedings of the 13th Workshop on Privacy in the Electronic Society, ACM, 2014, 10 pages.

Tsai, "The impact of salient privacy information on decision-making" Diss. Carnegie Mellon University Pittsburgh, PA, 2009, 319 Pages.

* cited by examiner

US 10,528,762 B2

1

DENIABLE OBFUSCATION OF USER LOCATIONS

DOMESTIC PRIORITY

This application is a continuation of U.S. patent application Ser. No. 15/489,887, filed Apr. 18, 2017, the content of which is incorporated by reference herein in its entirety

BACKGROUND

Embodiments of the invention relate in general to user location information, and more specifically to deniable obfuscation of user locations.

Mobile technology has accelerated the pace at which people access, acquire and generate data. Users are often concerned with protecting information that they consider to be private, such as their current geographic location. These privacy concerns can conflict with mobile device application functionality which often relies on knowing a current location of a user.

SUMMARY

Embodiments of the invention include methods, systems, and computer program products for implementing deniable obfuscation of user locations. A non-limiting example method includes receiving, using a processing system, a geographic location of a user. A trust level of an application is determined. Based at least in part on the trust level of the application meeting a threshold, the geographic location of the user is transmitted to the application. Based at least in part on the trust level of the application not meeting the threshold, a semantic label associated with the geographic location of the user is determined. The semantic label describes a type of place located at the geographic location of the user. An obfuscated geographic location that preserves the privacy of the geographic location of the user and is associated with a semantic label consistent with the semantic label associated with the geographic location of the user is generated. The obfuscated geographic location is transmitted to the application in place of the geographic location of the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

2

Figure 4:
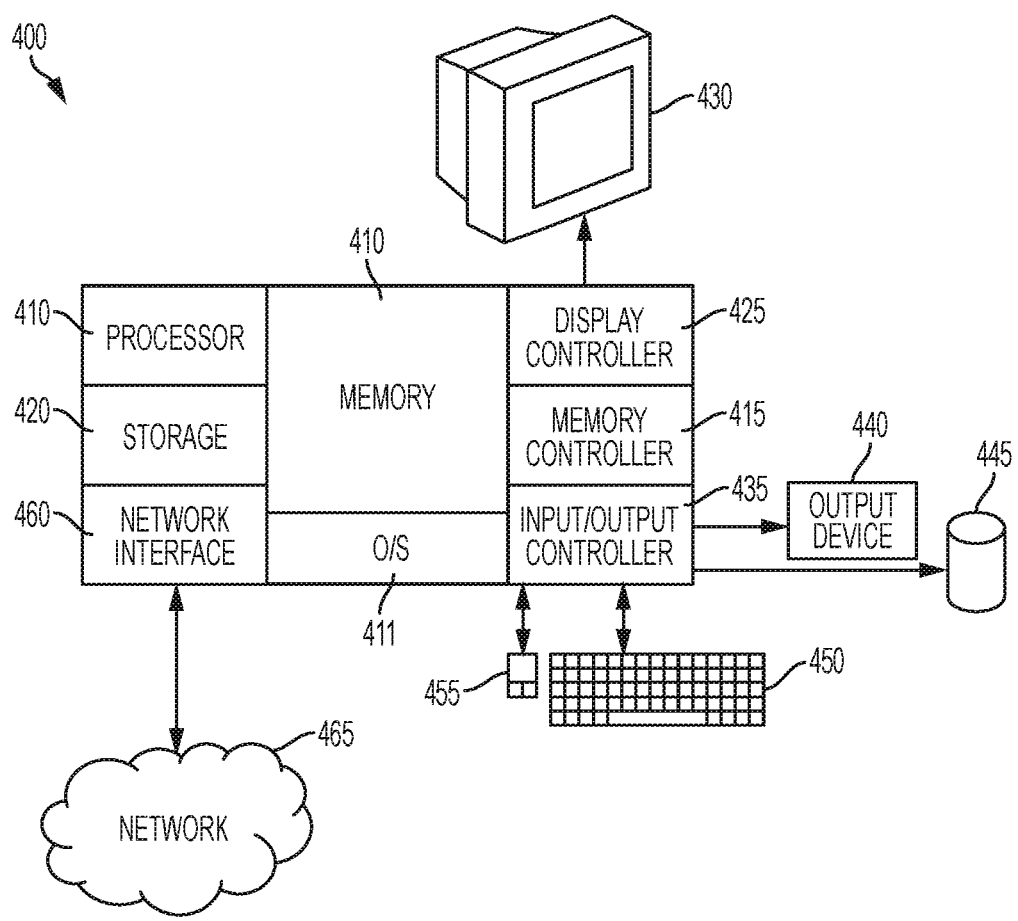

FIG. 4 is a block diagram of a computing device for implementing some or all aspects of a system for deniable obfuscation of user locations in accordance with one or more embodiments of the invention.

DETAILED DESCRIPTION

One or more embodiments of the invention described herein provide obfuscated geographic locations to selected applications in place of actual user geographic locations. The obfuscation is deniable in that an obfuscated geographic location has characteristics that are similar to the actual user location and it appears to the receiving application to be the actual user location. One or more embodiments of the present invention assist users in protecting their privacy by not revealing a user's actual geographic location or trajectory to an application unless it is required for the application to function properly. In accordance with one or more embodiments of the invention, the user's privacy is protected without impacting the functionality of the applications that utilize the user's geographic location.

User privacy can often conflict with application functionality. For example, navigation applications require access to the actual location of a user in order to provide directions from a current geographic location of the user to a target geographic location of the user. Other applications use authentication logic that requires access to a user's Facebook profile. Sometimes the functionality of an application may justify the privacy degradation (e.g., navigation applications) and other times it may not (e.g., contextual advertising, analytics, cross-application profiling). At the same time, if fake, or obfuscated, data is served to an application, there is the possibility that the application will notice that the data has been changed and suspend its functionality.

In accordance with one or more embodiments of the invention described herein, an application cannot tell when the user location data that it accesses has been obfuscated to hide the actual geographic location of the user. In addition, because certain use cases justify access to the actual user geographic location, the decision on when and how to obfuscate the user location becomes contextual. One or more embodiments of the invention provide deniable obfuscation, which, similar to deniable encryption, is based at least in part on the concept of enabling multiple views of the same data with varying degrees of distortion, all of which are indistinguishable.

Figure 1:
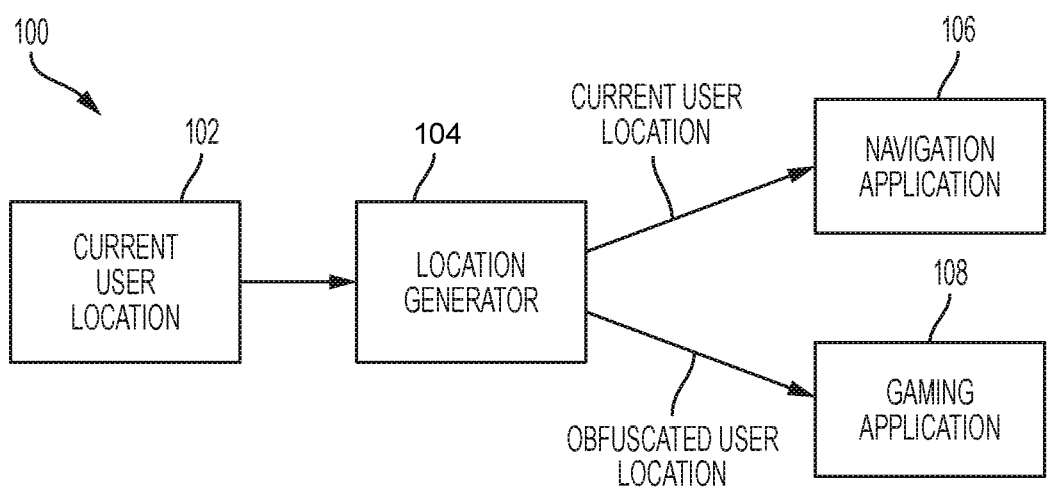
FIG. 1 is a flow diagram of a process for deniable obfuscation of user locations in accordance with one or more embodiments of the invention.

Turning now to FIG. 1, a flow diagram 100 of a process for deniable obfuscation of user locations is generally shown in accordance with one or more embodiments of the invention. As shown in FIG. 1, a current user location is input to a location generator 104, and depending on a trust level of the application, either the current user location or an obfuscated user location is output from the location generator 104 to an application. Two applications that require access to the user's geographic location and/or trajectory are shown in FIG. 1, namely a navigation application 106 and a gaming application 108. The navigation application 106 can have a high trust level because the user trusts the navigation application 106 and understands the importance of providing actual geographic location data about the user to the functionality of the navigation application 106. Based at least in part on the trust level of the application having a high trust level and thus meeting a threshold (e.g., a trust level threshold), the location generator 104 outputs the actual or current user geographic location to the navigation application 106.

The navigation application 106 is contrasted with the gaming application 108, which receives an obfuscated user location because it is associated with a lower level of trust and therefore does not meet the threshold. For example, the gaming application 108 can be programmed to send an alert to the user when the user enters his home or office. The actual geographic location of the user is not critical to this functionality of the gaming application 108, as the gaming application 108 is using the geographical location solely to identify a semantic location of the user. In this example, the gaming application 108 will perform the alert function as long as the geographical location corresponds to a semantic label of home or office. An obfuscated user location can be sent to the gaming application 108 and as long as it corresponds to a location with the same semantic label as the current user location, the functionality of the gaming application will not be impacted.

As shown in FIG. 1, in accordance with one or more embodiments of the invention, different geographic locations, each representing a geographic location of the user, are sent to the different applications. The level of obfuscation of a geographic location, if any, is based at least in part on a trust level associated with the application. The trust level of an application can be user modifiable and entered by the user as part of installing the application. An initial trust level of an application can also be automatically generated based at least in part on a type of the application or other criteria. Any number of trust levels can be implemented by one or more embodiments of the present invention.

In accordance with one or more embodiments of the invention, a single threshold is utilized, and if an application meets the threshold, then an actual geographic location of a user is sent to the application. If the application does meet the threshold, then an obfuscated geographic location is sent to the application. In this example the obfuscated geographic location can be any geographical location that has the same semantic label as the actual geographic location of the user. In addition, the obfuscated geographic location can also be consistent with a location trajectory (current or past) of the user or a population of users that includes the user, which may increase the probability of retaining plausibility of the obfuscated geographic location.

In accordance with one or more embodiments of the invention, a plurality of thresholds is utilized, with each threshold associated with a different level of obfuscation. For example, if a semantic location is the user's office, levels of obfuscation can include: office, building, county, state, and country, each associated with a different threshold. In this case, if the trust level of an application does not meet the threshold associated with the building but it does meet the threshold associated with the county, this means that the obfuscated user location should be outside of the building to hide the user's current geographic location, but within the county in order retain plausibility of the obfuscated user location as being valid. Similarly, a peer-to-peer application that relies on user input for real time traffic congestion and route planning would require precise location information about the road segment that is currently congested but a life-logging application can retain most of its functionality with a less precise level of location information.

Figure 2:
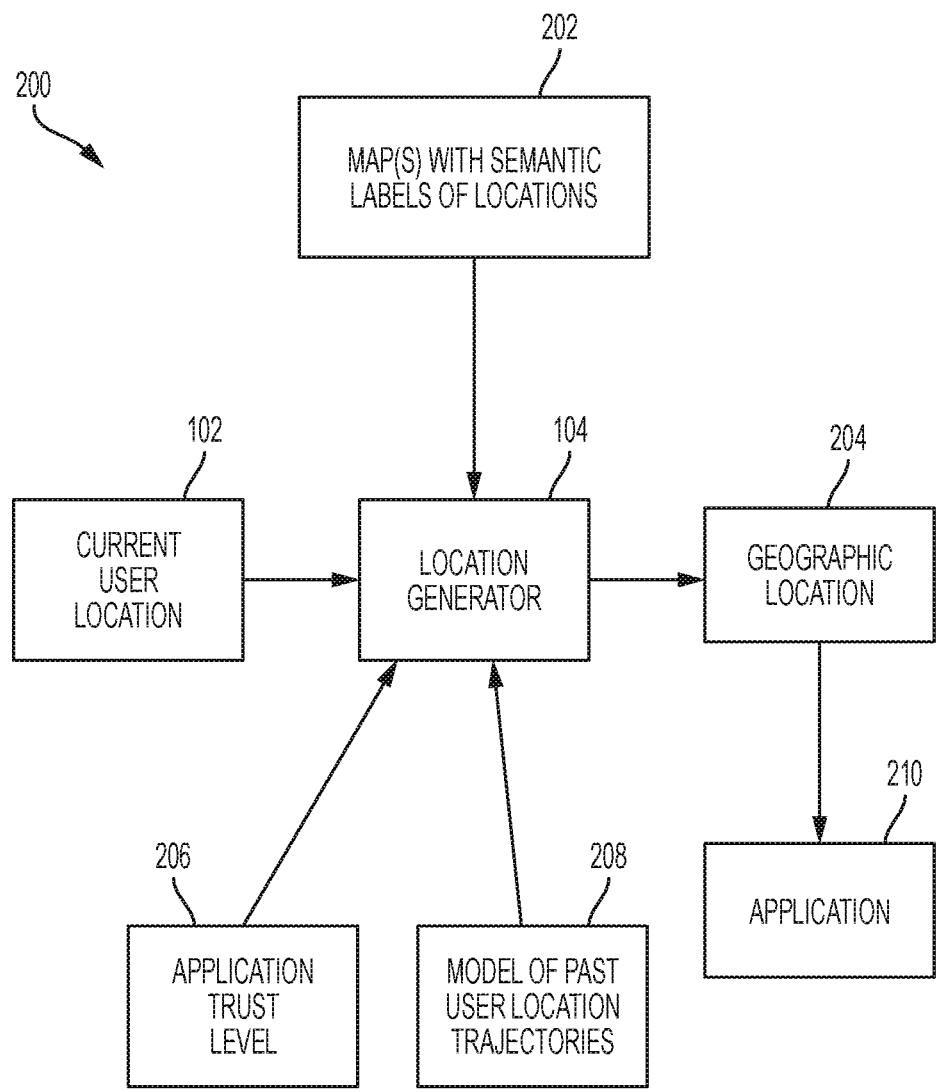
FIG. 2 is a block diagram of a system for deniable obfuscation of user locations in accordance with one or more embodiments of the invention.

Turning now to FIG. 2, a block diagram 200 of a system for deniable obfuscation of user locations is generally shown in accordance with one or more embodiments of the present invention. In accordance with one or more embodiments of the invention, private data is released to an application after applying a predetermined level of obfuscation. The level of obfuscation can include no obfuscation which results in releasing the actual user location. One or more embodiments of the invention can include generating a probabilistic model (e.g., a Markov chain) based at least in part on multiple users. During a release event (e.g., a release of a geographic location to an application), the private field (e.g., user location) is mapped into a coarse representation such as a semantic location. Based at least in part on the model, the coarse representation is refined into a concrete representation (e.g., an obfuscated geographic location).

The system shown in FIG. 2 includes one or more map(s) 202, or other representation, of semantic labels of semantic locations and their associated geographic locations, which are utilized by the location generator 104. Semantic locations are types of places such as schools, offices, homes, etc., and a semantic label associated with a geographic location describes the type of place that is associated with the geographic location.

FIG. 2 also shows a current user location 102, an application trust level 206, and a model of past user location trajectories 208 being input to the location generator 104. In accordance with one or more embodiments of the present invention, a geographic location is specified as global positioning system (GPS) coordinates, or as a longitude and latitude pair. The current user location 102 can be received from a GPS receiver located on a user device such as a mobile device.

All or a portion of the elements shown in FIG. 2 can be located on a user device. In accordance with one or more embodiments of the present invention, the model of past user location trajectories 208 is generated on a system remote from the user device. The model of past user location trajectories 208 can be accessed by the user device via network or can be stored on the user device.

FIG. 2 also depicts a geographic location 204 as an output from the location generator 104. The geographic location 204 can be an actual user geographic location or an obfuscated geographic location, depending on a trust level associated with the application 210.

In accordance with one or more embodiments of the invention, the location generator 104 works by initially generalizing geographic locations to higher level semantic abstractions and then instantiating the abstractions back to geographic locations. One way in which the location generator 104 can create different levels of location generalization is by converting geographic locations specified as latitude and longitude pairs into geo-hashes. The resolution of a geo-hash (i.e., how many bits have been used to specify the location) indicates the precision of the location. As the resolution is decreased (i.e., the number of bits used to specify the location decreases), the precision of the location decreases or in other words the location is generalized. For example, a 128-bit geo-hash can be reduced to 120 bits as part of generalization. The reverse process of instantiation generates bits to fill in the removed bits and then maps the geo-hash back to geographical latitude and longitude (there is one-to-one correspondence between a geo-hash and a geographic location). Another possible implementation of the location generator 104 is based at least in part on location hierarchies explicitly specified by the user. The extent to which a series of locations will be generalized can be determined by the trust score and the level of privacy desired for a particular application.

Figure 3:
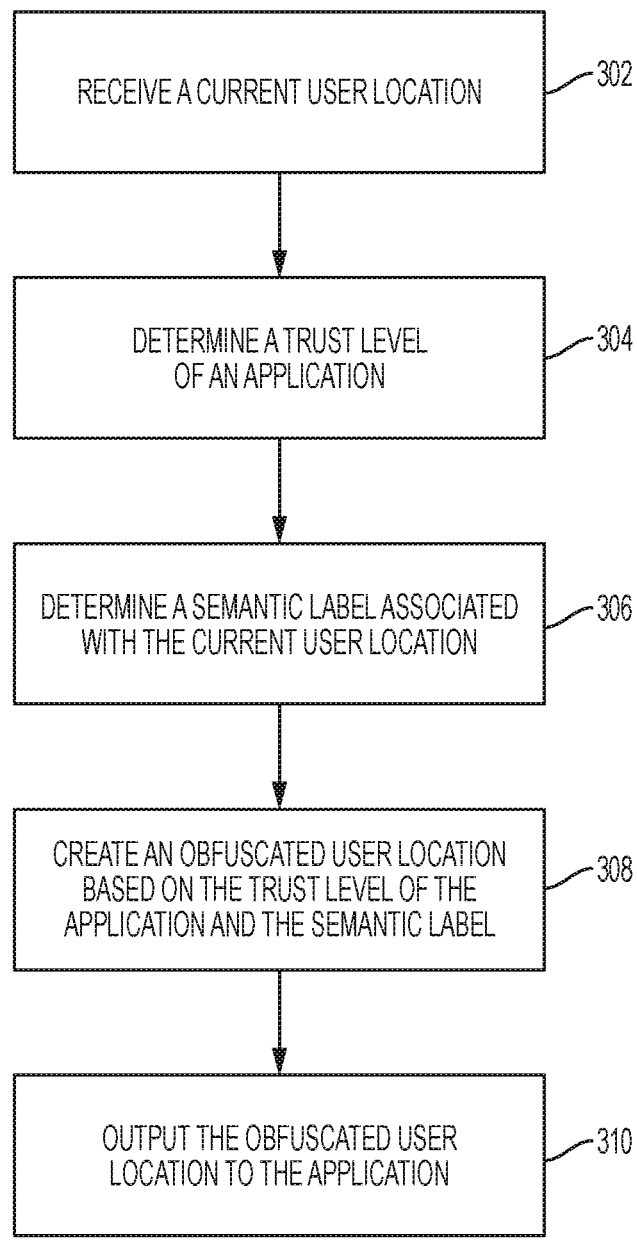
FIG. 3 is a flow diagram of a process performed by a location generator for performing deniable obfuscation of user locations in accordance with one or more embodiments of the invention.

Turning now to FIG. 3, a flow diagram 300 of a process performed by a location generator, such as location generator 104, for deniable obfuscation of user locations is generally shown in accordance with one or more embodiments of the invention. At block 302, a geographic location of a user is received by the location generator 104, and at block 304, a trust level of an application is determined. A semantic label associated with the received geographic location is determined at block 306. At block 308, an obfuscated geographic location is created based, at least in part, on the trust level of the application and the sematic label. The obfuscated geographic location that is created preserves the privacy of the current geographic location of the user and is associated with a semantic label that is consistent (e.g., the same, or in the same category, etc.) with the semantic label associated with the current geographic location of the user.

At block 310, the obfuscated user location is output to the application 310 in place of the geographic location of the user. In accordance with one or more embodiments, the output to the application is in response to the application requesting a current geographic location of the user.

In accordance with one or more embodiments of the invention, blocks 306, 308, and 310 are not performed in response to the trust level of the application meeting a threshold, and the actual geographic location of the user is transmitted to the application. Blocks 306, 308, and 310 are performed when the trust level of the application does not meet the threshold.

In accordance with one or more embodiments of the invention, the obfuscated geographic location is also consistent with a current location trajectory of the user that includes the current geographic location of the user. The obfuscated geographic location can also be consistent with one or more past location trajectories of the user or a population of users that includes the user. In accordance with one or more embodiments of the invention, information from different users is aggregated to form a probabilistic model for synthesis of trajectories. These concrete traces can be moved to a higher level of abstraction by, for example, mapping concrete locations to regions or to some semantic tag (e.g., work, home, supermarket, etc.). The abstract representation can be refined into a concrete trajectory per the model, where deniability and plausibility stem from the fact that at the abstract level, the actual and fake trajectories are identical.

Turning now to FIG. 4, a block diagram of a computer system 400 for use in implementing some or all aspects of a system for implementing plausible obfuscation of user location trajectories is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 400, such as a personal computer, workstation, minicomputer, or mainframe computer.

In an exemplary embodiment, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. A conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the dispatch systems and methods of this disclosure.

The computer system 400 may further include a display controller 425 coupled to a display 430. In an exemplary embodiment, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In an exemplary embodiment, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing Deniable Obfuscation of User Locations as described herein can be embodied, in whole or in part, in computer program products or in computer systems 400, such as that illustrated in FIG. 4.

Technical effects and benefits of embodiments of the invention include the ability to obfuscate actual user locations in order to protect the privacy of a user. The obfuscated geographic locations have characteristics that are similar to the actual user locations and appear to a requesting application to be the actual user locations. Thus, the obfuscated geographic locations protect the privacy of the user without impacting the functionality of applications that utilize the user's geographic locations.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, using a processing system, a geographic location of a user;
   determining a trust level of an application;
   based at least in part on the trust level of the application meeting a threshold, transmitting the geographic location of the user to the application; and
   based at least in part on the trust level of the application not meeting the threshold:
      determining a semantic label associated with the geographic location of the user, the semantic label describing a type of place located at the geographic location of the user;
      creating an obfuscated geographic location that preserves the privacy of the geographic location of the user and is associated with a semantic label consistent with the semantic label associated with the geographic location of the user; and
      transmitting the obfuscated geographic location to the application in place of the geographic location of the user.

2. The computer-implemented method of claim 1, wherein the obfuscated geographic location is further consistent with a location trajectory of the user that includes the geographic location of the user.

3. The computer-implemented method of claim 1, wherein the obfuscated geographic location is further consistent with one or more past location trajectories of the user.

4. The computer-implemented method of claim 1, wherein the semantic label associated with the obfuscated geographic location is the same as the semantic label associated with the geographic location of the user.

5. The computer-implemented method of claim 1, wherein the threshold includes a plurality of levels and a value of the obfuscated geographic location varies based at least in part on which of the plurality of levels are not met by the trust level of the application.

6. The computer-implemented method of claim 1, further comprising receiving a request from the application to access the geographic location of the user.

7. The computer-implemented method of claim 1, further comprising receiving a request from an other application to access the geographic location of the user, and transmitting an other obfuscated geographic location different than the obfuscated geographic location to the other application in place of the geographic location of the user.

* * * * *